United States Patent Office 3,342,742
Patented Sept. 19, 1967

3,342,742
METHOD OF PREPARING ALUMINATE COAGULANTS
Thomas G. Cocks, Park Ridge, Ill., assignor to Nalco Chemical Company, Chicago, Ill., a corporation of Delaware
No Drawing. Filed Mar. 24, 1964, Ser. No. 354,439
3 Claims. (Cl. 252—175)

ABSTRACT OF THE DISCLOSURE

This invention is concerned with an improved coagulating agent which is exemplified by sodium aluminate which has been surface impregnated with from 2 to 40% by weight of the colloidal clay such as bentonite. This improved coagulating agent is characterized as having improved feeding characteristics and is highly uniform in composition.

---

The instant invention is concerned with novel alkali metal aluminate compositions, their method of manufacture, and use as coagulants. More specifically, the present invention relates to alkali metal aluminates which are surface-impregnated with nucleating agents, their mode of preparation, and specific use as quick-acting floc-formers.

The sum total operation of coagulation may generally be broken down into two rather distinct steps. The first phase of the operation is known as the "fast" coagulation step. Simply speaking, this involves addition of a chemical known as a primary coagulant to turbid aqueous liquids which contain colloidal particles which are to be agglomerated or flocculated. The suspended particles in the water rendering it impure are most often negatively charged. The additive chemical has the role of reducing this charge or actually reducing the zeta potential whereby an over-all reduction of particle repulsive forces takes place. Some attraction then occurs with adherence of colloidal particles to one another whereupon larger particles are built up. However, at the completion of this phase of the process the adhering particles are still of a size falling within the colloidal or near colloidal range.

The second phase of the coagulation operation is known as the "slow" coagulation step. Here, the above newly formed particles are further increased in size until an actual visible floc is formed. Yet another chemical is added during this step or concurrent with the pirmary coagulant addition in order to promote formation of such flocs and materially increase the rate of their formation. This additional class of chemical additives is known as coagulant aids. These aids generally have a larger particle size than the partially flocced particles discussed above. Thus, a heterogeneous system is created in the aqueous liquid to be purified. By statistical calculations and empirical experimentation it has been determined that the probability of two smaller particles colliding and adhering is much less than the probability of one small particle and one larger particle doing the same. Due to this fact, chance for collision is promoted and opportunity for adhesion increased due to presence of the coagulant aid.

Two distinct classes of chemicals are generally required to cause the fast and slow coagulation steps to be carried out most efficiently and in a minimum amount of time. Addition of a primary coagulant alone to a system to be coagulated results in a situation wherein flocs are formed only at a relatively slow rate. The residence time in coagulating equipment, such as coagulating basins, required to achieve removable flocs is much longer than is desired. A rapid coagulation operation can therefore not be achieved, and equipment is tied up an undue amount of time. Consequently, throughput of impure waters is materially decreased per unit time, and the overall purification operation is rendered less effective than normal. In many instances, consumer or industrial demand for a sufficient amount of relatively pure water cannot be flulfilled. Likewise, sole use of a coagulation aid is generally entirely unsatisfactory and in most instances initiation of particle growth during the fast coagulation step is never even realized.

Thus, it can be seen that in most instances two distinct chemical classes must be employed to achieve rapid and efficient floc formation. As an example, one excellent source of a primary coagulant is an alkali metal aluminate, such as sodium aluminate. Generally, for best results, a coagulant aid must be additionally employed to work in efficient concert with the sodium aluminate. Certain problems arise, however, with use of the two chemicals. One of the most serious problems results from uneven feeding of the respective chemicals. Separate metering is required which must be closely regulated in order to achieve proper proportions of primary and secondary coagulant addition. At various purification sites best efficiency is achieved only by following rather closely controlled feed conditions. Such feed control may be difficult or impossible to achieve with equipment available. Another serious problem, resulting from use of two separate chemicals as coagulation additives, is one of solubility. In many instances the solubility characteristics of the secondary and primary coagulant materially differ. Thus, if for example, the secondary coagulant is less soluble than the primary coagulant, a lag in performance results and rapid floc formation is frustrated.

If a combination of primary and secondary coagulants is made up in the form of a pre-mix, certain disadvantages and problems are still present. Due to non-uniformity of particle size and density among the primary and secondary coagulant, stratification of the mixture into two separate layers occurs. Erratic performance occurs due to inconsistent and varying proportions of the chemicals in the mixture. Inconsistent performance thus leads to poorly purified water and problems in its subsequent use.

It would therefore be an advantage to the art if a single unitary composition could be devised which would act both as a primary and secondary coagulant. If, for example, a composition could be achieved which would include an alkali metal aluminate primary coagulant source as well as a secondary coagulant portion, considerable advantages would accrue. First, the problem of separate feeding of primary and secondary coagulants would be obviated. Second, consistent performance results could be achieved. In addition, if solubility difficulties of the secondary coagulant could be overcome, which may occur whether separately added or in admixture form, the performance lag of the secondary coagulation compound in following the action of the primary coagulant could be overcome. This would increase the overall rapidity of the coagulation operation whereby greater aqueous liquid throughput per unit could be achieved. Likewise, a single composition would overcome the disadvantages of use of a conventional mixture, necessarily involving non-uniformity of the blend due to varying physical characteristics of the respective components comprising the coagulation mix. Other advantages would be apparent.

It therefore becomes an object of the invention to provide an improved coagulating agent, which single reagent acts both as a primary and secondary coagulant.

A specific object of the invention is to provide an alkali metal aluminate composition which is characterized as a rapid-acting floc-former with an overall efficiency heretofore unachievable with prior art alkali aluminates.

Yet another object of the invention is to provide an improved method of coagulation involving use of a soluble, quick-acting unitary composition having activity both as a primary and secondary coagulant.

Another object of the invention is to provide a simple and efficient method of making a rapid-acting coagulating agent having characteristics of both a primary and secondary coagulant.

A specific object of the invention is to provide an extremely soluble surface-impregnated sodium aluminate composition which is therefore immediately available for coagulant use, thereby achieving a more rapid total coagulation performance.

Other objects will appear hereinafter.

In accordance with the invention, a new and improved coagulating agent has been discovered. In its broadest aspects this agent comprises as a unitary solid composition an alkali metal aluminate primary coagulant having surface-impregnated therein, a nucleating agent. The nucleating agent acts as a secondary coagulant in further promoting floc formation. This is best achieved if the nucleating agent has at least one of its dimensions in the colloidal particle range. The most preferred nucleating agents have at least one dimension less than 1 micron. The surface-impregnated alkali metal aluminate composition is specifically characterized as rapid-acting in promoting formation of flocs of previously colloidally-suspended materials comprising impurities in aqueous systems. The invention is also concerned with a simple and efficient method of making the above coagulating agent, and as well, relates to its use in the coagulation process itself.

The above discussed composition is best and more fully described by a discussion of its mode of formation. In order to form the compositions of the invention, a simple but efficient technique is followed. In the main, this consists of adding the nucleating agent to a wetted solid source of alkali metal aluminate such as sodium aluminate. For convenience sake the following discussion will be devoted to sodium aluminate though it is understood, of course, that it is equally applicable to other alkali metal aluminates.

It has been determined that in order to properly surface-impregnate the sodium aluminate, rather critical limits with respect to the water component of the sodium aluminate must be followed. Specifically, it has been discovered that the sodium aluminate source should contain less than 35% water, whether this be in form of molecularly bound water or extraneous water. When in this wetted form, the sodium aluminate is a receptive media for the subsequently added nucleating agent. Specifically, the sodium aluminate has the requisite adhesiveness whereby the nucleating agent when added thereto becomes tightly bound to the sodium alumiate particles. The type of physico-chemical bond between the sodium aluminate and nucleating agent composing the product solid composition is not broken down by handling or attrition. Rather, the total composition remains intact until the composition is used. Yet, when added to the impure water source the nucleating agent and sodium aluminate are both immediately solubilized and made available to assume their respective roles in the overall coagulation process.

By the term "surface-impregnated" is meant that the outer surfaces of the sodium aluminate particles have a nucleating agent intimately diffused or permeated throughout.

The particular alkali metal aluminate source such as sodium aluminate may be produced via a number of known processes. Various exemplary methods of producing alkali metal aluminates are set out in U.S. Patents 3,023,169; 3,002,809; and 2,345,134. For use in the instant invention, the most preferred sodium aluminate compositions to be impregnated, have $Na_2O$ to $Al_2O_3$ molar ratios of from 1.05:1 to 1.25:1.

One excellent way of surface-impregnating the sodium aluminate with nucleating agent, is by effecting such step during the drying operation of the sodium aluminate itself. More specifically, sodium aluminate is first formed by digestion of alumina and caustic via any of the just described methods. The liquor is then concentrated and finally dried by contact with a hot surface such as by conducting the concentrated liquor onto a revolving hot drum. Contact with the drum induces formation of hot solid particles in an adhesive state. It has been determined that the nucleating agent is most advantageously applied to the sodium aluminate adhesive solid particles when they are being subjected to contact with this hot surface. At this time the water content is generally below about 35% and usually comprises 25–35% by weight of the total weight of the damp sodium aluminate composition.

The nucleating agent is added to the above partially dried or damp mass of sodium aluminate by a number of methods. In one method, the nucleating agent may be sprayed upon the adhesive sodium aluminate. Generally, the nucleating agent itself is in dry form, and is sprayfed by conventional spray feeding equipment upon the hot outer or exposed surface of the sodium aluminate layer in contact with a dryer drum. One exemplary type of feeder involves fluidizing a powdery source of the solid nucleating agent by means of air and subsequently contacting the adhesive surface of the sodium aluminate by continuously running a discharge nozzle rapidly over the whole of the hot surface containing sodium aluminate. In order to achieve a more uniform product the spray device should contain a plurality of discharge outlets which continuously contact the moving surface of adhesive sodium aluminate with fluidized nucleating agent. In this manner, all or substantially all of the top surface of sodium aluminate is contacted and impregnated with the nucleating agent.

The impregnated sodium aluminate is then further dried such as by means of gas ovens or further contact with a hot surface. The final composition is a solid free-flowing granular material which contains less than 25% of water, usually in the form of molecularly bound water. Frequently, the surface-impregnated aluminate composition contains 5–25% by weight of water. After the final drying, it is usually preferred to grind or pulverize the solid composition into smaller usable particles which are then immediately ready for use in a coagulation process.

In one specific embodiment, after the coating operation has been achieved by application of a relatively continuous stream of nucleating agent upon the moist surface of the sodium aluminate being dried on a hot revolving drum, knife blades are so situated that the surface-impregnated composition is released from the drum and caught in a hopper. Continuous-type belts transfer the composition to drying ovens to further reduce moisture content. Finally, the treated sodium aluminate material is broken into smaller units and bagged or drummed for use.

Generally sufficient nucleating agent is added to the wetted sodium aluminate mass in order to produce a final composition containing 2–40% by weight of nucleating agent based on the total weight of the alkali metal aluminate and nucleating agent. More often the interdispersed nucleating agent comprises 2–25% by weight of the total composition.

The nucleating agent itself, acting as a secondary coagulant source, may be chosen from a wide variety of substances. For example, clays such as montmorillonite, kaolinite, halloysite, vermiculite, saponite, hectorite, attapulgite, etc., may be used. It is understood, of course, that naturally occurring clays generally contain a variety of two or more of the above listed constituents in a naturally occurring mineral form. These clay minerals are admirably suited for use in the instant invention. Other nucleating agents may likewise be applied to the sodium aluminate base. Such agents include silica in activated solid form or in aqueous sol form, metal oxides such as iron oxide, aluminum oxide, magnesium oxide, calcium oxide, etc., and organic polymers or copolymers. The latter class includes compositions which have a hydrophilic group generally attached to the backbone of a polymeric structure whereby requisite water solubility or dispersibility is achieved. A few such water-dispersible synthetic organic polymers or copolymers which may be surface-impregnated into alkali metal aluminates include the sodium salt of polyacrylate, polymethacrylate acid sodium salt, maleic anhydride-vinyl acetate copolymer, polyvinyl methyl ether-maleic anhydride copolymer, polymethacrylic acid, polyacrylic acid, polyvinylpyridinehydrochloride, polyvinyl pyrrolidone, polyvinyl alcohol, polyvinyl methyl ether, polyvinyl acetate emulsion, acrylic acid-acrylamide copolymer, polyacrylamide, acrylic acid-styrene copolymer, condensation polymers of amines and epihalohydrins such as epichlorohydrin, condensation polymers of polyalkylene polyamines and epihalohydrins, melamine-aldehyde condensation products, polyethylene imine, polyoxyalkylenes such as polyethylene oxide, etc. Another class of coagulant aids are carbonaceous type materials such as activated carbon. A number of other nucleating agents may likewise be used. By the term "nucleating agent" is meant a substance which acts as a secondary coagulant by providing a nucleus for colloidal or near colloidal suspended particles whereupon visible flocs are formed which may be removed by conventional methods.

The following example illustrates a typical mode of preparing a coated composition of the invention.

*Example 1*

A source of sodium aluminate liquor produced by the conventional process of digestion of sodium hydroxide and alumina trihydrate resulted in a sodium aluminate having an approximately $Na_2O$ to $Al_2O_3$ molar ratio of 1.08 to 1 and solids content of approximately 47–48%. After the digestive cook, the product was placed in a concentrator and further concentrated to a solids content of 55–60% by weight of solid sodium aluminate. The heated sodium aluminate was then transferred to a further concentrator which was in the form of a weir box, the fourth side of which was completed by a hot drum roll. The concentration of sodium aluminate in the weir box was approximately 63–73% by weight of solids. The hot adjacent roll picked up a layer of sodium aluminate liquor and solidified it. The temperature of the roll was approximately 280–360° F. After the roll had made approximately an 180° revolution, knife blades scraped off the now solid product which fell into a hopper. The solids concentration of the sodium aluminate on the drum was approximately 66–75% by weight.

The surface-impregnation operation was accomplished as follows in a continuous manner. After the roll had begun its revolution and picked up a layer of sodium aluminate from the weir box, fluidized bentonite clay was added to the adhesive solid damp mass of sodium aluminate. The clay was added at a point when the drum had made approximately a 90° turn from the contact point with the batch of sodium aluminate liquor. The spreading equipment as used in this operation included a spreader arm approximately 12′ long connected to a source of clay and positioned directly above the revolving drum roll. The spreader contained a series of slots approximately 3″ apart. An agitating disc forced the bentonitic clay through the slots whereby the fluid clay was thus deposited upon and penetrated the damp receptive sodium aluminate. A strongly bonded diffusion of sodium aluminate and clay was formed in the outer surface of the contacted sodium aluminate layer. The final product was then dried to an approximate 20% water content. The clay comprised about 8–9% by weight of the total composition including both sodium aluminate and clay.

In another specific embodiment of the invention a dried source of sodium aluminate was wetted to a 25–35% water content and clay nucleating agent applied to the wetted mass. Good surface-impregnation was effected under conditions of room temperature, and the final product after drying was again eminently suitable as a rapid acting floc-former.

The sodium aluminate compositions of the invention possess many advantages with respect to coagulation use, over a mixture of components or over separate use of both a primary and secondary coagulant. In the first place the compositions being relatively uniform in proportion of alkali metal aluminate to nucleating agent, give consistent results once the specific level of treatment dosage in the particular coagulation problem has been experimentally determined. Likewise, products having a wide ratio of nucleating agent to aluminate base may be produced, which may therefore be conveniently tailored to fit various coagulation needs.

Also, as mentioned above, separate metering of two sources of primary and secondary coagulant chemicals had previously led to a variety of control problems. This specific problem has now been overcome. Also, since the nucleating agent is firmly affixed to and diffused into the outer surface of the alkali metal aluminate base material, the problem of stratification of layers which exists with mixtures of separate components is no longer a factor.

Surprisingly, the final unitary composition of the invention had better solubility than its respective components. For example, when clay is used as an auxiliary or secondary coagulant aid alone, it possesses poor solubility relative to the sodium aluminate primary coagulant. Thus, there is a time lag between the time of its addition and time the clay actually begins its performance. Such disadvantage is not present with respect to use of the compositions of the invention. In like manner, a clay impregnated sodium aluminate demonstrates greater solubility than does the sodium aluminate base substance when dissolved itself. Both the sodium aluminate and clay are immediately dispersed or dissolved whereupon their respective roles in the coagulation operation are immediately initiated and carried out to the fullest extent. It is not understood exactly why a surface-impregnated sodium aluminate composition has better solubility than the constituent reactants or components when used as sole reagents. However, it is believed that in the impregnation operation itself nucleating agents such as clays are pre-swelled, and therefore able to be solubilized more rapidly because of the prior conditioning. Also, it is thought that nucleating agents such as clays are actually activated in the impregnation process. The coagulation rate is thereby increased to a greater degree than is possible with use of unmodified nucleating agents.

In addition to achievement of consistency of performance as well as obviating the problem of separate chemical feeding of two or more different coagulants, yet another advantage accrues through formation of the compositions of the invention. It had previously been noted that alkali metal aluminates such as sodium aluminates have a tendency to agglomerate somewhat during storage and shipping. At the very minimum this caking causes the coagulation operation to be slowed down somewhat in that the mass of sodium aluminate must be somehow broken down into smaller, more easily solubilized units just prior to their use. In the instant invention the surface-impregnated compositions, and in particular, clay impregnated sodium aluminate materials, show little or no tendency to cake upon storage even after long periods of time and in relatively humid atmospheres. This is a distinct advantage since the product as manufactured can be used immediately without any further processing whatsoever even after long periods of standing.

The treated aluminate products are rapid acting floc-formers, and as a general rule form removable flocs in less time than it takes when a mixture of like components is employed or a combination of chemicals is added from separate sources. As noted above, this is probably due to increase of solubility or dispersibility of the product compositions as well as some type of further activation of the nucleating agents during the impregnation reaction.

The alkali metal aluminate compositions may be used in a number of coagulation processes, including coagulation of aqueous suspensions of both industrial and potable water sources. For best results the coagulant should be applied in an amount of from 0.001% to about 3.0% based on the weight of the aqueous liquid to be treated. Both river waters and lake waters containing suspended solids such as clays, silts, inorganic salts and oxides of inorganic compounds as well as certain other materials of varying composition may be clarified by addition of these materials. Sewage or waste can be concentrated by a coagulation and settling process involving use of the above discussed compositions. Other types of synthetic suspensions formed in aqueous liquids which may be processed, are those resulting from the processing of various types of ores in such industries as the uranium mining industry, and copper mining industry. Another type of synthetic suspension which is frequently formed is the suspension resulting from the washing of coal and the treating of certain steel mill wastes.

The impregnated alkali metal aluminates and particularly treated sodium aluminates, are especially useful as adjunct chemicals in the lime-soda softening process. Briefly, by addition of lime and soduim carbonate to hard waters, it is possible to produce insoluble carbonates in the form of finely divided particles which will normally tend to slowly settle from the treated water. It is customary in many lime-soda softening operations to improve the overall efficiency of the process by adding coagulants to expedite the settling rate of the insoluble carbonates.

The aluminate materials are particularly useful in coagulating and rapidly settling finely divided solids, especially those which are predominantly inorganic and normally remain suspended in water. They are particularly effective in coagulating dilute solutions of water containing concentrations of predominantly inorganic solids. Phosphate mine waters, coal washing waters, clay suspensions, calcium carbonate suspensions, etc., which result from industrial processes such as mining, washing, purification and the like are examples of just a few sources of impure water which may be coagulated.

In another field of endeavor, the aluminate compositions have found efficient use in clarifying brine and brackish waters used in the recovery of petroleum by secondary water-flooding operations. Even these difficultly clarified brackish waters may be coagulated. The coagulants of the invention also find use in a variety of natural occurring waters used in such industrial operations as papermaking, petroleum refining, hydroelectric plants, atomic energy operations, metal plating, boiler plants, and the like.

Although not as effective in coagulating the above type waters, the compositions of the invention may also be used to coagulate and settle solids existing as heavy slurries, such as copper concentrates and copper tailings in ore flotation processing. The rate of settling and extent of clarity of the supernatant process liquid is increased through use of the coated aluminate compositions. Such aqueous suspensions as uranium tailings, and limestone and taconite slurries may be acted upon by the alkali metal aluminates.

Coagulation of the above type suspended solids is achieved by merely adding and mixing a surface-impregnated aluminate composition with the suspension. The composition may be added in dry form or previously made up into aqueous solutions or dispersions. The coagulated solids are then separated from the aqueous media in most cases by merely permitting the solids to settle out. There are times, however, when the separation is effected by filtering or other processing steps. The expression "separating the resultant coagulated solids from suspension in water" as employed here is meant to include and cover separation by settling as well as separation by actually recovering the coagulated solids from the water, as by filtering, and separation by removing the water from the coagulated solids as by decanting, or allowing the supernatant water to overflow.

When it is desirable to coagulate and settle low turbidity water suspensions, the most preferred practice is to treat these suspensions with from about 0.1 to 30 parts of aluminate composition per million parts of suspension being treated. This amount, of course, may vary according to the degree of difficulty of coagulation of the particular suspension. When coagulating heavy suspensions it may be necessary to use considerably more aluminate composition to achieve the desired results. Such heavy slurries generally contain solids in a range of about 10% to about 70% by weight of the total suspension. In many instances it is necessary to use dosages of coagulant as high as 1000 p.p.m. based on the solids content of the heavy slurry.

Having thus described my invention, what I desire to secure by Letters Patent is:

1. A method of preparing a unitary coagulating agent which is composed of an alkali metal aluminate, a colloidal clay and water and which is characterized as having the properties of improved feeding and handling which comprises the steps of adding from 2 to 40% by weight, based on the weight of the total composition, of a colloidal clay to a wetted solid alkali metal aluminate surface, whereby the surface of the alkali metal aluminate is coated with the colloidal clay, and then drying the thus coated alkali metal aluminate to a moisture content within the range of from 5 to 25% by weight.

2. The method of claim 1 wherein colloidal clay is a bentonitic clay and is added to the wetted solid alkali metal aluminate surface in an amount ranging from 2 to 25% by weight, based on the weight of the total composition.

3. The method of claim 2 wherein the colloidal clay is saponite.

References Cited
UNITED STATES PATENTS

| | | | |
|---|---|---|---|
| 1,604,126 | 10/1926 | Kern | 210—47 |
| 2,284,827 | 6/1942 | Lindsay et al. | 252—175 |
| 2,420,340 | 5/1947 | Ryznar | 210—52 |
| 3,023,169 | 2/1962 | Walker | 252—175 |
| 3,082,173 | 3/1963 | Horvitz | 252—181 |
| 3,219,578 | 11/1965 | Cruickshank et al. | 210—52 |

FOREIGN PATENTS 447,740    4/1948    Canada.

LEON D. ROSDOL, *Primary Examiner.*

H. B. GUYNN, *Assistant Examiner.*